United States Patent [19]

Nieber

[11] 4,090,365
[45] May 23, 1978

[54] PORTAL FRAME FOR TRENCH BOX STACK

[75] Inventor: Allen J. Nieber, Northville, Mich.

[73] Assignee: Efficiency Production, Inc., Okemos, Mich.

[21] Appl. No.: 731,131

[22] Filed: Oct. 12, 1976

[51] Int. Cl.² ............................................. E21D 5/00
[52] U.S. Cl. ...................................... 61/41 A; 61/105
[58] Field of Search ................ 61/41 A, 41 R, 63, 84, 61/105

[56] References Cited

U.S. PATENT DOCUMENTS

| | | | |
|---|---|---|---|
| 1,768,146 | 6/1930 | Ramey | 61/41 A |
| 2,633,713 | 4/1953 | Shields | 61/41 A |
| 2,777,294 | 1/1957 | Rosa et al. | 61/41 A X |
| 3,212,270 | 10/1965 | Benintend | 61/41 A |
| 3,782,126 | 1/1974 | Pavese | 61/41 A |
| 3,992,887 | 11/1976 | Fisher | 61/41 A |

FOREIGN PATENT DOCUMENTS

| | | | |
|---|---|---|---|
| 532,849 | 1/1941 | United Kingdom | 61/41 A |

*Primary Examiner*—Dennis L. Taylor
*Attorney, Agent, or Firm*—Miller, Morriss and Pappas

[57] ABSTRACT

A portal frame attached to the open end of a trench box structure and assembling and rigidifying the stacked plural boxes forming the smooth wall sides of the consequent trench box whereby side sections or panels of trench boxes are stackably adjustable as to depth or trench served and the portal span provides maximum clearance for the pipe.

5 Claims, 7 Drawing Figures

PORTAL FRAME FOR TRENCH BOX STACK

The present invention is directed to a new and improved trench box portal frame. The frame is secured to plural sides or sections of trench box in stacked edgewise relation so as to provide adequate rigidity in the enlarged trench box and so as to provide an adjustment of the box in respect to height. This greatly extends the utility of trench box sides and allows the portal frame to be easily knocked down and transported in manageable pieces. In addition, the present structure maximizes work clearance for pipe being worked on by the box.

The principal object of the present invention is to achieve rigidification in plural stacked side sections so that the height of the box can be adjusted to the desired working depth and so that a maximum of working clearance is provided at or adjacent to the pipe or work which the trench box straddles.

Still another object is to provide a knock-down transportable construction so that monster boxes can be shipped flat as components instead of requiring the transport of large and unwieldy construction.

Another object is to provide strength in the portal frame boxes which is enhanced under use conditions.

Other objects including maximum strength with minimum weight using standard sized trench box sides and with attendant economy will be appreciated as the description proceeds.

THE PRIOR ART

Trench boxes are relatively well known and some of the first of such structures were used in wood constructions where a frame construction was built in the trench and shored with vertical lagging in prevention of cave-ins and the intrusion of debris. Metal boxes followed, as exemplified in the U.S. Pat. Nos: to J. M. Rosa et al 2,777,294; to A. R. S. Morrice 3,641,773; to E. Torti 3,089,310, 3,543,522; 3,473,366; to H. Jost et al 3,541,799; and to J. Krings 3,869,867. Such devices used spreaders to separate the side support plates and included, in some instances, smooth sides, reinforcement, and a variety of fastening means. None propose or suggest the combining of plural sides for stacking and reinforcing portal structure acting to rigidify and strengthen the trench box construction while maximizing the working space.

IN THE DRAWINGS

GENERAL DESCRIPTION

Figure 1:
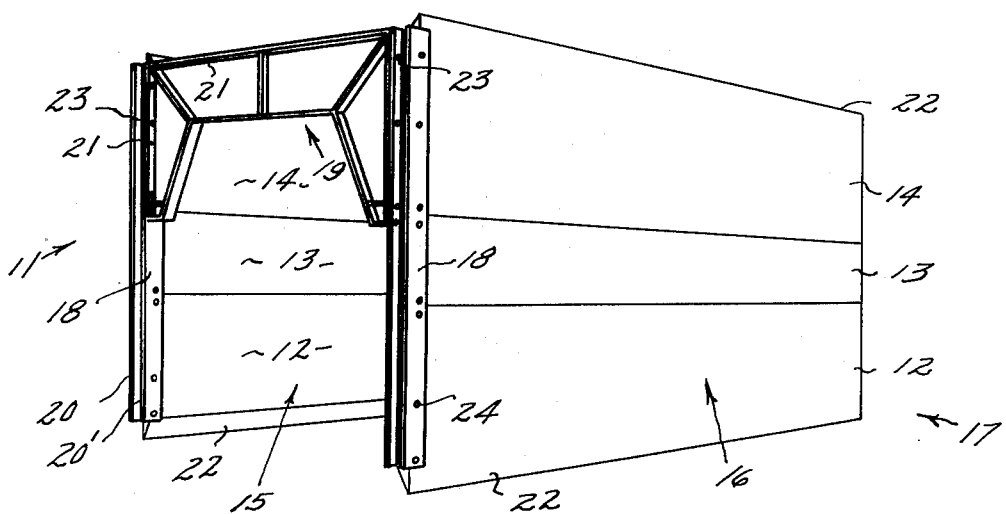
FIG. 1 is a perspective view of a portal framed trench box in accord with the present invention and viewed from the open or portal end.

In general, the portal frame comprises a pair of spaced-apart upright structural section elements such as a pair of H-beams. The wide flanges of the structural section provide gripping means for the ends of plural stacked trench box sides and at the top the flanges provide simultaneous attachment to a portal arch-cap which spans the gap between the upright H-beams and attaches to the uppermost of the trench box panels to provide structural stability thereto and all vertical stress components are carried into the high strength vertical H-beams and thence into the stacked plural boxes and through the shoes or skids into the earth of the trench. The portal cap is a truss-like arch and comprises a central web in the form of a rectilinear arch and is stiffened by wide peripheral flanges and intermediate flange braces in the manner of a truss designed to carry vertical and torsional loading while assembling the trench box sides and maintaining the proper orientation of the upright H-beams in respect to the stacked trench boxes. The vertical ends of the arch extend to interconnect the panel sections and are of a width substantially equal to the inner width flange of the columns or uprights. Lateral diagonal bracing is provided without intrusion on the open work space formed by the portal and extends to connect to the uppermost of the trench box panels in each side.

At the end of the trench box opposite the portal frame is a tubular cross bracing and spacing gage. The tubular cross bracing is socket connected to the trench box sides or walls and the gate span is bolted in place beneath the cross bracing. The height of the trench box is established by the number and height size of trench box sides used and this allows the contractor to utilize the trench box sizes for other uses than with the portal frame.

In assembly the selected trench box number of panels to form the sides are fastened at their portal ends to the portal frame and the cross bracing and cross gating is secured at the opposite end. The tubular cross bracing is pinned at sockets for easy assembly and disassembly and provides excellent spacing retention for final bolting of the stacked box sides to the portal frame and cross gating. Those bolts which pass through the box sides enter tubular sleeved passageways so as to prevent the intrusion of water into the box sections. This keeps weight and corrosion at a minimum. These same connections, using dismountable fasteners such as bolts, nuts and thrust washers, allow adjustment to manufacturing tolerances at assembly. The boxes are metal having substantially smooth inner and outer skins welded to an integral structural frame core with upper, lower and intermediate box sections and vertical stretchers. The flat knock-down characteristics will be readily appreciated as the description proceeds and the boxes and frames are provided in aluminum and steel and the chisel edged skids or running shoes are primarily preferred in steel having good abrasion resistance.

SPECIFIC DESCRIPTION

Referring with specific reference to the drawings and with first reference to the FIG. 1 thereof, a portal frame 11 is illustrated which retains plural trench box sides or panels 12, 13 and 14 in stacked vertical relation and forming the spaced-apart composite walls 15 and 16 of a super trench box 17 of selected composite height. When not thus assembled, the trench box sides 12, 13 and 14 may be used by contractors in smaller trench box structures without the portal frame 11. As can be seen, the portal frame 11 comprises a pair of spaced-apart upright or vertical structural columns in the form of H-beams 18 held in parallel relation by the portal cap or arch piece 19. As will be seen, the arch or portal cap 19 is connected through the box sides and through the wide inner flanges 20 and 20' of the uprights 18. The perimeter flannge 21 of the cap 19 is about equal in width to the flanges 20 and 20' of the uprights 18 and may be preassembled and attached to the uprights on the outboard end thereby facilitating attachment to aligned box and assembled sides 12, 13 and 14 or other selected height combinations. The shoe or skid edges 22 of the box panels 12 and 14, for example, may face upwardly or downwardly in reference to the ground served and where the shoe 22 is included on the panel 14 it is preferably faced upwardly as shown.

Thus, two lines of bolts on the portal frame 11 are established and distributed as required to provide the adequate bracing and strength in resistance to crushing and torsional loading. The outer line of bolts 23 passes through the inner flanges 20' of the H-beam sections and secures the cap 19 to the vertical support elements 18 at the flange interphases. The inner line of bolts 24 pass through the flanges 20 and 20' and through the inner and outer skins 15 and 16 of the trench box sides 12, 13 and 14. As will be seen, this inner line of bolts 24, in passing through the sides 15 and 16 at the ends thereof, are protected so that water and debris cannot intrude the structure and increase the weight and corrosion of the trench box 17.

Figure 2:
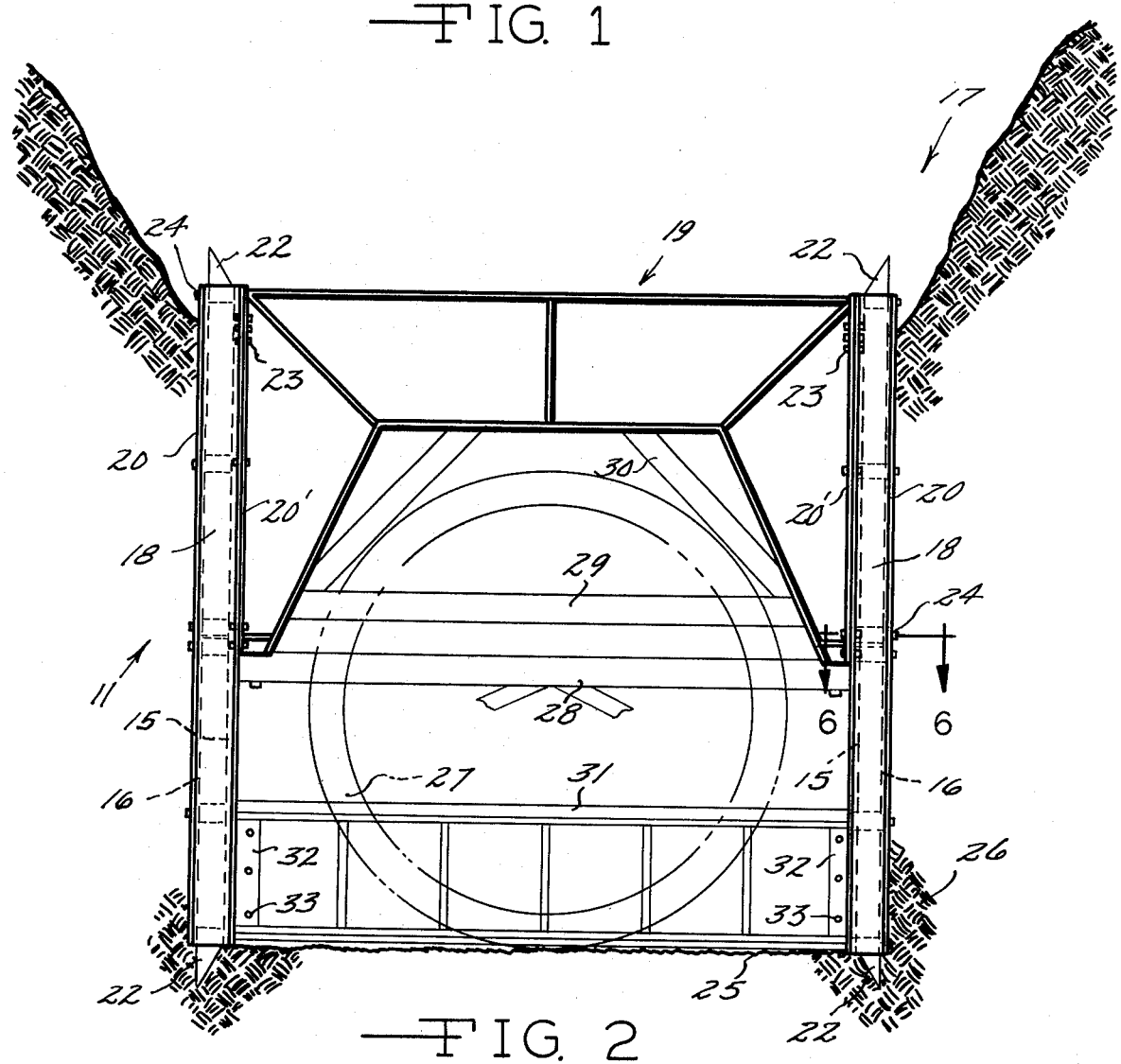
FIG. 2 is a front elevation view from the portal end of the trench box seen in the FIG. 1.

In FIG. 2 the trench box 17 with portal frame 11 is shown resting in a trench 25 dug into the earth 26 as shown. The trench box 17 is seen to accommodate a large diameter pipe 27 (phantom line) so that the trench box 17 can be skidded along straddling the pipe 27 and providing ample clearance for work on the pipe within the box and without endangering the pipe 27 or workers. Tubular cross bracing 28 and 29 is visible as installed at the end of the trench box 17 opposite the portal end. As will be seen, these are pinned to cylindrical stubs projecting inwardly from the skins 15 of the box panels 12, 13 and 14. The cross bracing 29 includes diagonal struts 30 providing torsional bracing. The cross gate 31, sometimes designated as a dirt plate and acting as a spreader, provides lower separator support between the sides of the trench box 17 and is secured thereto by suitable angles 32 and bolts 33.

Figure 3:
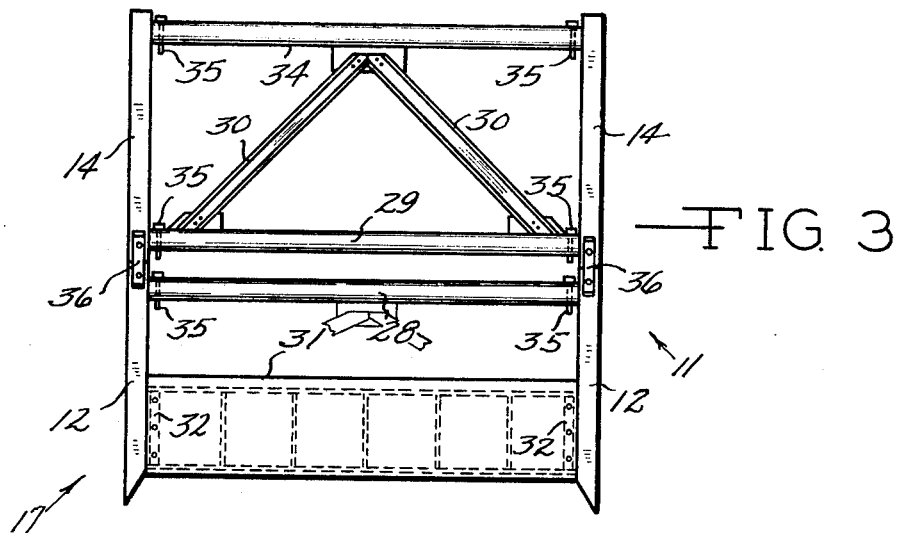
FIG. 3 is a rear elevation view from the end of the trench box of FIG. 1 opposite the portal frame end.

In FIG. 3 the tubular cross bracing 28 and 29 and the cross gating 31 and tubular top bar 34 are visible. The pins 35 are seen which provide simple removable connection of the tubular members 28, 29 and 34 to the plural stacked sides or panels 12 and 14 which establish the height of the trench box 17. A pair of splice plates 36 connect the ends of the two adjacent stacked sides 14 and 12 by bolting thereto and in facilitation of assembly and erection.

Figure 4:
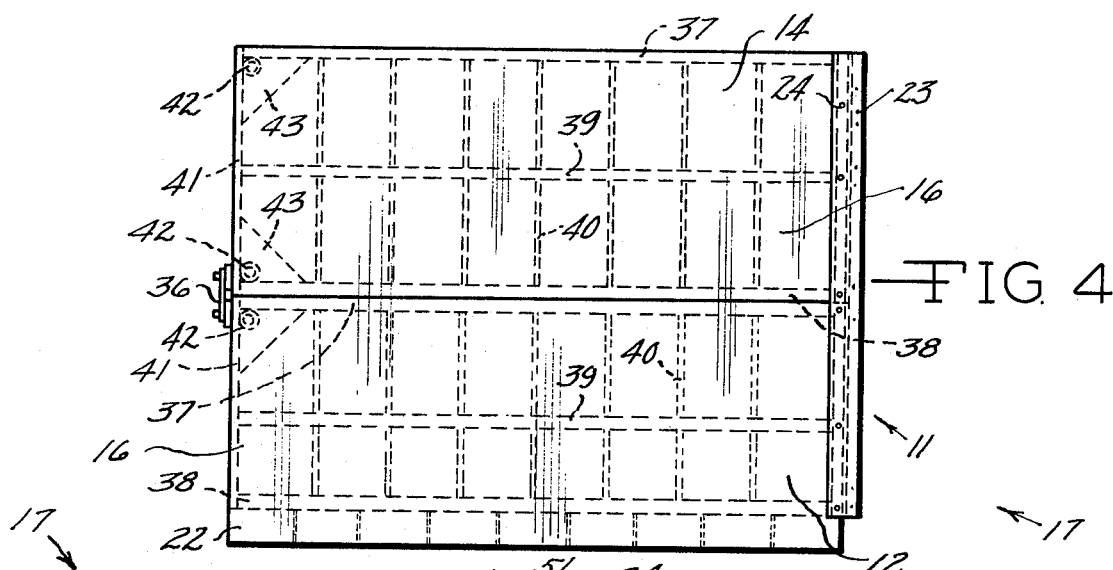
FIG. 4 is a side elevation view of the trench box of FIGS. 1-3 and revealing the portal frame in structural support of stacked trench box sides at selected height.
Figure 5:
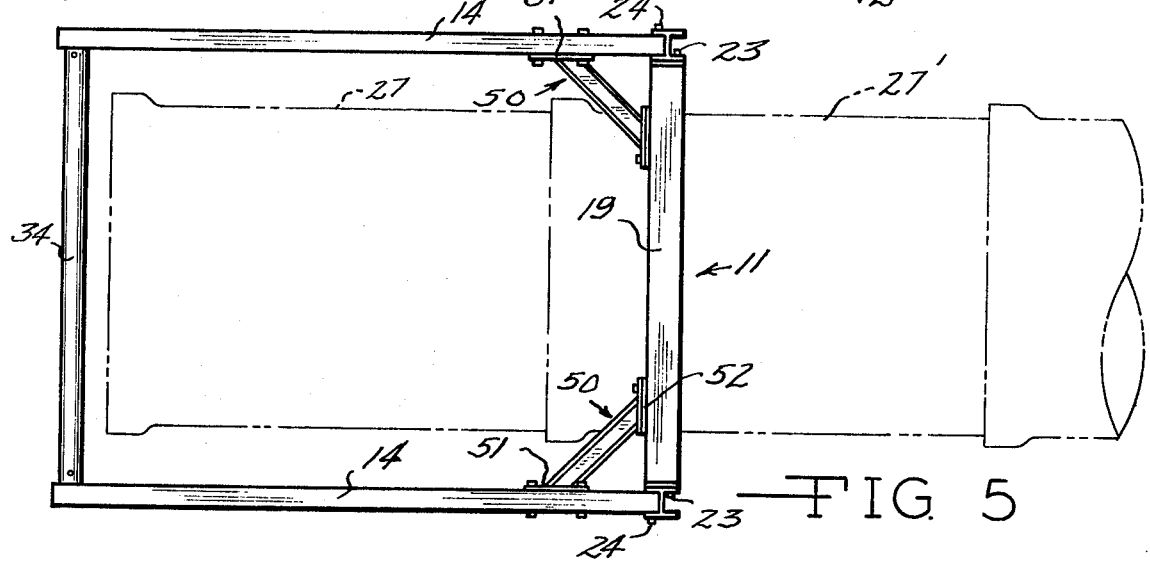
FIG. 5 is a top plan view of the structure seen in FIG. 4 and showing pipe extending rearwardly of the portal and indicating the accommodation of large diameter pipe or working face.

In FIG. 4 the portal frame 11 is seen in profile at one end of the multi-tiered trench box 17 made up of trench box sides or panels 12 and 14. In hidden edge lines the skeletal inner structure of the sides 12 and 14 are revealed and comprise a box section top rail 37 or equivalent and box section bottom rail 38 or equivalent with intermediate box sections or stringers 39 in intervals depending for internal strength on the height size of the particular side 12 or 14 and with vertical structural members 40 as channels or box sections intermediate the top and bottom rails at spaced intervals as shown. The panels 12, 13 and 14 and their skeletal inner support structure are welded together so that the strength of the panels is a composite of the elements (skin and skeletal support) in each panel. The depending skid or rail shoe 22 is shown extending beneath the side 12. A structural box section or post 41 is provided vertically at each end of the sides 12 and 14. The stubs 42 are visible in hidden edge line and reinforced by the plates 43 and form the connecting ends for the tubular cross bracing 28, 29 and 34. As previously related, the structural core is encapsulated on both sides by the attachment of skins 15 and 16 of sheet material welded in place. The FIG. 5 best illustrates the ability of the trench box 17, made possible by the portal frame 11, to straddle the large diameter pipe 27 (shown here as bell and spigot) by virtue of the high arch and excellent box stabilizing support made possible by the cap structure 19 secured to the uprights 18 and in turn secured to the arch ends of the panels or sides 14 and 12 in stacked relation. The inner and outer bolt lines 23 and 24 are best understood from this diagram and the spacing and bolt pattern is a matter of selection to provide maximum strength and stability together with ease of fabrication and preassembly of the portal frame 11.

Reinforcing corner braces 50 are shown diagonally and detachably fastened to the arched portal frame 11 and the upper box panels 14 on the inside thereof as shown. Thrust distributing plates 51 at interphase between the panels 14 are employed and the reinforcing structural element 50 is shown as an H or I structural section. A similar thrust plate 52 is applied to the arch structure of cap 19. As constructed, the braces 50 do not interfere with the arch dimension of the cap 19 in accommodation of large diameter pipe 27. From the FIG. 5 the operation and usage of the trench box 17 can be best appreciated. A trench of adequate depth is dug and the box 17 is dropped into or erected and dragged into position in the trench and provides a shoring or barrier against collapse of the trench walls and the intrusion of mud slides and debris. Pipe is dropped into the space sheltered by the box and is attached to the next preceeding section of pipe 27'. Then the box 17 is advanced toward the left of the FIG. 5 into newly opened trench and the shelter of the box 17 is then available for additional sections. The pipe 27 passes out from under the arch 19 as shown. In general, as the diameter of the pipe 27 increases, the length of the pipe sections is relatively reduced so that, depending on the length of box 17 and pipe sections, several connections can be made. The high arch made possible by the present structure and the adjustment of height by using composite panels 12, 13 and 14 to suit the depth of trench is a substantial advance in trenching endeavors.

Figure 6:
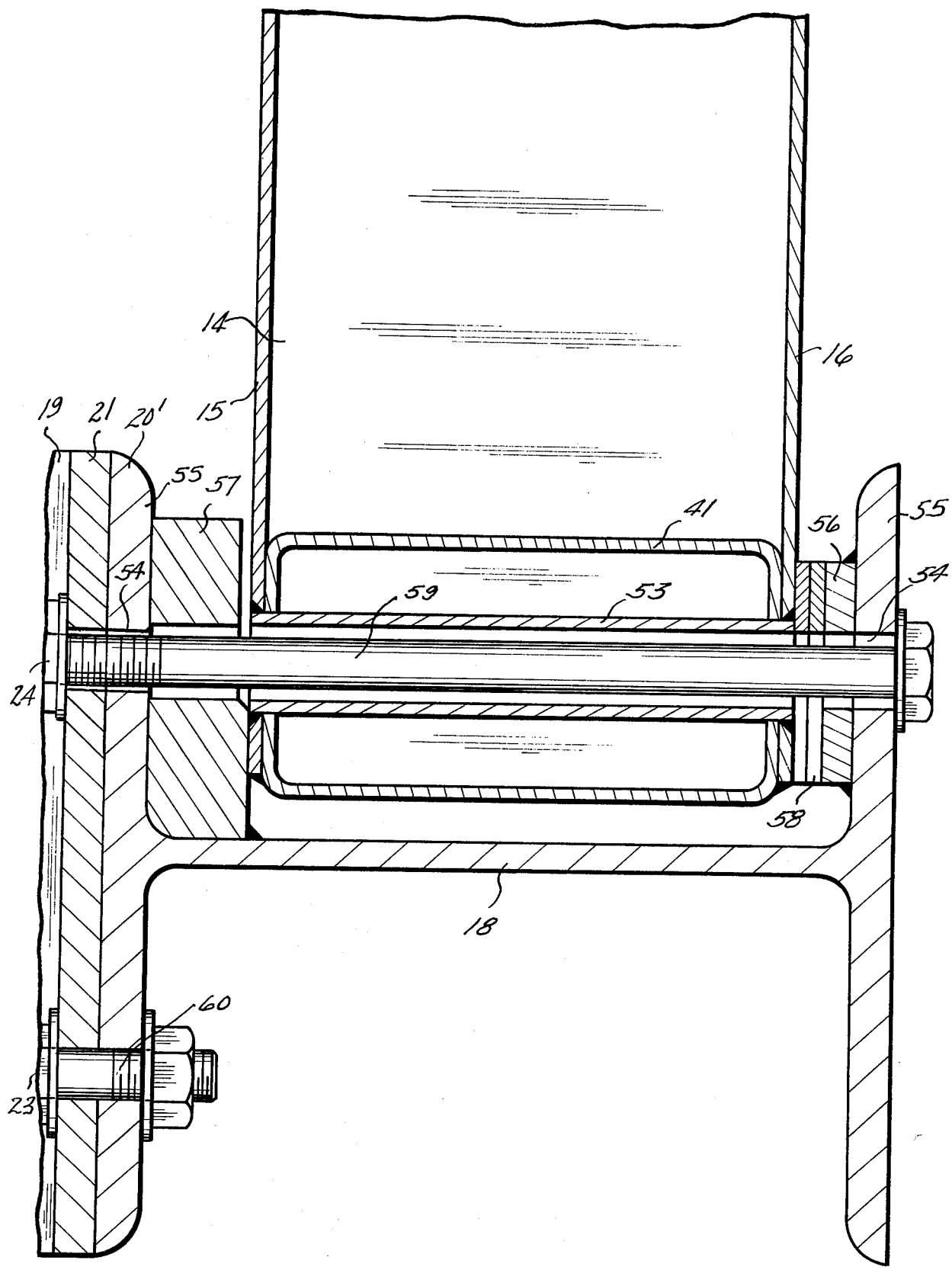
FIG. 6 is a cross-section taken on line 6—6 of FIG. 2 and indicating the isolation and journalling procedures for fasteners extending through the box structure in prevention of water intrusion between the inner and outer skins of trench box sides.

The FIG. 6 best illustrates the type of journalling and isolation used in fastening the sides or panels 12, 13 and 14 to the vertical or upright portal frame members 18. A tube or sleeve 53 is passed through the end box section 41 of the panel 14, as shown, and the tube 53 is fillet welded as illustrated to the skins 15 and 16. Mating openings 54 are provided in selected spaced relation along the connecting flanges 55 and these are backed on the inner side by thrust pads 56 and 57, as shown, and the pads 56 and 57 are welded in registering position at the openings 54. By use of U-shaped skims 58, final alignment and snugness is established when the bolt 59 on the inner bolt line is passed through the adjacent perimeter flange 21 of the arch-cap 19 and the entire structure is tightened by bolting using nuts and thrust washers in accord with good practice. As will be seen, preliminarily in the assembly of trench box 17, the shorter bolts 60 with associated nuts and washers are used to secure the arch-cap 19 to the uprights 18. Plural of the tubular sleeve connections in the tubes 53 are provided in accord with translation of stress and in situations in which the connection passes through the box panels 12, 13 and 14 thus eliminating any leaking into the interior of the panels 12, 13 and 14 and in providing assembly tolerance with good bearing strength.

Figure 7:
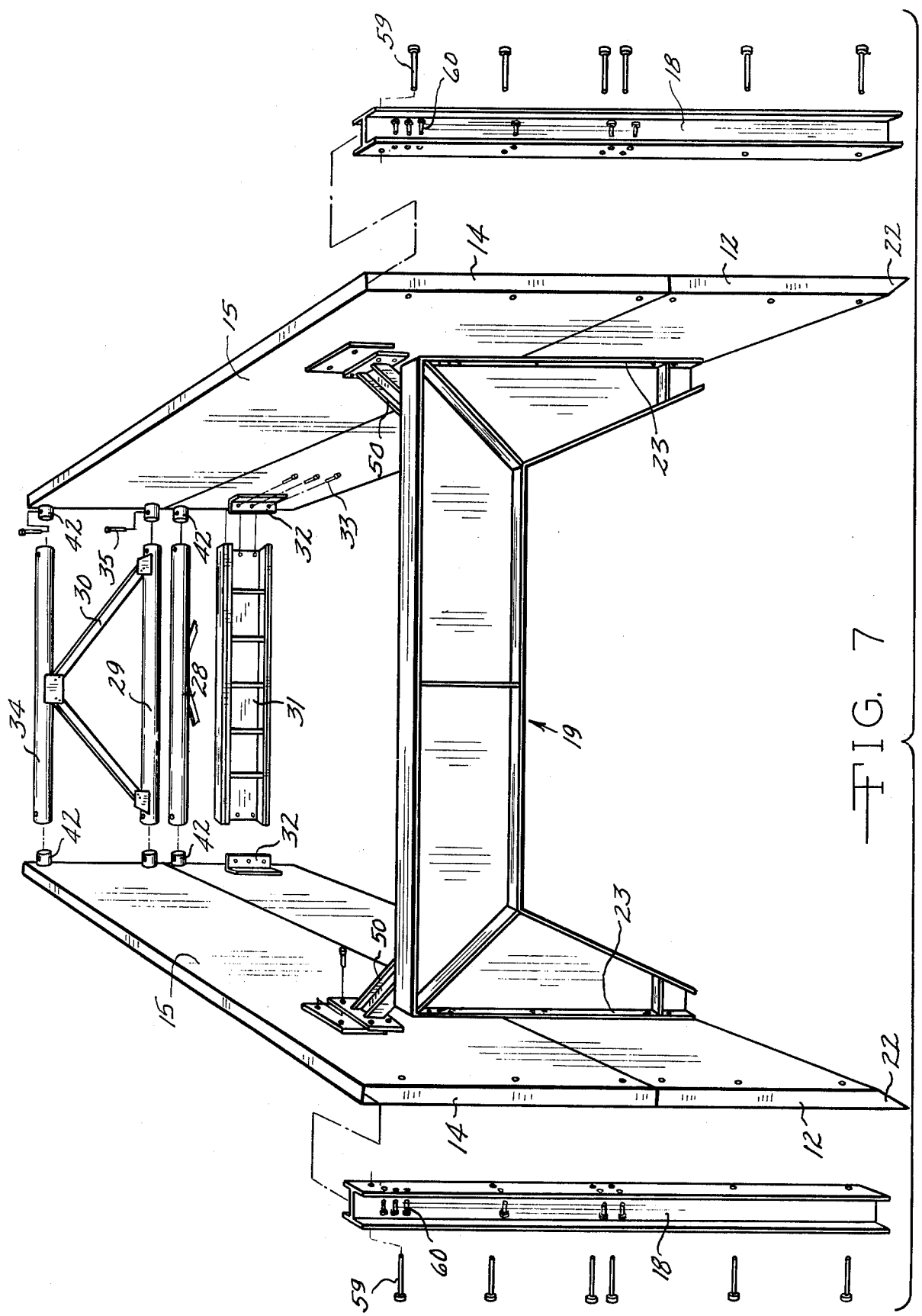
FIG. 7 is a somewhat schematic perspective view of the portal frame and trench box of the present invention in illustration of the knock-down aspects of the invention for ease of assembly, handling, disassembly and transport.

Assembly and disassembly of boxes 17 can best be understood by reference to the exploded FIG. 7. The portal frame 11 is formed by joining the arch or cap element 19 to the upright H-beams 18 using the outside bolts 60 which pass through the inner facing flanges of the upright members 18 and through the adjacent flanges of the cap 19 where the flanges 21 interphase against the uprights 18. The plural panel sections such as 12 and 14 are placed in stacked relation as shown and are assembled in spaced aligned relation by the attachment of the spreaders 28, 29 and 34 pinned on the stubs 42 and cross braced by the struts 30. Not seen in FIG. 7 the splice plates or straps 36 are secured across the adjacent panel 12 and 14 and the cross gate 31 is bolted between the flanges of the mounting angles 32. This orients one end of the trench box 17 and prepares the assemblage for attachment at the portal end to the portal frame 11. This is easily achieved since the verticals 18, with openings for the long bolt 59, receive the panels 12 and 14 between the flanges and the long bolts 59 are passed through the flanges and panels 14 and 12 and the perimeter flange 23 of the arch or cap 19 and at the lowermost bolts 59 beneath the cap 19 the bolts 59 sandwich the panel 12 between the flanges as previously described. The diagonal bracing 50 achieves a further stabilization against torsional loading.

As will be appreciated, the assembly procedures can be reversed and the consequent disassembly frees the panels 12, 13 and 14 (or whatever height combination sought) for separate use in trench boxes without the portal frame and for use in shallower and narrower trenches, for example. The intermediate panels are preferred to have flush rails top and bottom but the top and bottom panels should or may include the shoe or sliding rail 22. As shown in FIGS. 1 and 2 inversion of the upper panel orients the rail 22 upwardly so that the line between panels 12 and 14 is a flush line.

The potential stacking intervals for height are established by the material limits and the limits of the ground in which the trench is formed. Bolt spacing intervals and size of fasteners are a matter of selection depending upon materials and particular size and weight of members.

In operation, the trench boxes 17 in cooperation with the potal frame 11 can be shipped in a knock-down condition and the panel sections find use in trench box structures other than those described herein. Those skilled in the art will appreciate that variances in width of box is adjusted by changing to a shorter cap 19 equating the span with adjustment of the spacer elements 28, 29, 34 and 31. Where these structures have been used they have been acclaimed as substantially extending the range of use and in facilitating disassembly and storage between jobs.

Having thus described my invention and in particular the principal modifications thereof, those skilled in the art will perceive other modifications, improvements, and changes and such modifications, improvements and changes are intended to be included herein limited only by the scope of my hereinafter appended claims.

I claim:

1. A portal frame trench box stack comprising:
   a plurality of pairs of spaced-apart trench box panels comprising together a trench box stack;
   a pair of spaced-apart upright wide flange structural members of a height substantially equal to the height of said trench box stack;
   a truss-like peripherally flanged structural arch element secured to the inside flanges of said upright members at the upper ends thereof and including means through said flanges of said truss-like element and said flanges of said upright members to grip said trench box stack in rigid relation; and
   spreader elements in said trench box stack maintaining, with said wide flange structural members and said arch element, a relatively rigid construction.

2. In the structure of claim 1 wherein said means through said flanges are bolts and said bolts being isolated from said plural trench box panels by tubular sleeves.

3. In the structure of claim 2 in which said structural arch element includes diagonal bracing at the top thereof securable to the uppermost of said stacked panels on both sides.

4. A portal frame securing plural panels of trench boxes in spaced-apart stacked relation comprising:
   plural trench box panels in spaced-apart relation;
   spreaders at one end of said panels and removably secured to said panels for holding said panels in spaced-apart relation;
   a pair of flanged vertical columnar members, said flanges sandwiching said panels therebetween on one side;
   bolt means through said flanges and through said panels, said bolt means jacketed by tubular sleeves through said panels;
   a truss-like structural arch having a peripheral flange mating with the inner of said flanges of said columnar members and secured thereto first by bolts through the inner flange of said columnar member and the mating flange of said arch and second by said bolt means through said panels.

5. A knock-down trench box for easy assembly and disassembly comprising:
   a pair of trench box sides including plural stacked trench box panels of selected height;
   a spreader and spacer structure fastened at one end of said panels and maintaining said panels in spaced aligned relation at one end;
   a pair of H-section structural columns in spaced-apart relation at the ends of said panels opposite said spreader and spacers and the flanges on one side of said columns embracing therebetween the column ends of said panels;
   dismountable fastening means including tubular sleeves through said panels and said fastening means through both the inner and outer of said flanges of said columns;
   a truss-like structural arch-cap between said columns and having a perimeter flange mating with the inner flange of said columns and first secured to said columns by removable fasteners through said mating flanges and second by said fastening means through said panels; and
   diagonal bracing structure from the top portion of said arch-cap and to said uppermost of said panels on each side dismountably secured thereto by fastening means.

* * * * *

UNITED STATES PATENT OFFICE
CERTIFICATE OF CORRECTION

Patent No. 4,090,365  Dated 1978 May 23

Inventor(s) Allen J. Nieber

It is certified that error appears in the above-identified patent and that said Letters Patent are hereby corrected as shown below:

Column 1, line 38, "3,473,366" should read --- 3,473,336 ---

Column 3, line 13, "flannge" should read --- flange ---

Column 4, line 68, "skims" should read --- shims ---

Column 5, line 31, "bolt" should read --- bolts ---

Column 5, line 56, "potal" should read --- portal ---

Signed and Sealed this

Thirty-first Day of October 1978

[SEAL]

Attest:

RUTH C. MASON
Attesting Officer

DONALD W. BANNER
Commissioner of Patents and Trademarks